United States Patent [19]

Moody et al.

[11] Patent Number: 5,363,450
[45] Date of Patent: Nov. 8, 1994

[54] ACTIVE CONTROL OF NOISE

[75] Inventors: Martin J. Moody, Dunfermline, Scotland; Alan V. Yorke, North Warnborough, England

[73] Assignee: The Secretary of State for Defence In Her Britannic Majesty's Government of the United Kingdom of Great Britain and Northern Ireland, London, England

[21] Appl. No.: 930,620
[22] PCT Filed: Mar. 18, 1991
[86] PCT No.: PCT/GB91/00412
   § 371 Date: Sep. 30, 1992
   § 102(e) Date: Sep. 30, 1992
[87] PCT Pub. No.: WO91/14854
   PCT Pub. Date: Oct. 3, 1991

[30] Foreign Application Priority Data

Mar. 21, 1990 [GB] United Kingdom ............ 9006371.0

[51] Int. Cl.$^5$ ............................................ G10K 11/16
[52] U.S. Cl. .................................................. 381/71
[58] Field of Search .................................. 381/71, 165

[56] References Cited

U.S. PATENT DOCUMENTS

| 2,692,024 | 10/1954 | Burdett, Jr. et al. | |
| 3,936,606 | 2/1976 | Wanke | 381/71 |
| 4,194,095 | 3/1980 | Doi et al. | 381/165 |
| 4,859,345 | 8/1989 | Inagaki | 210/764 |
| 5,131,229 | 7/1992 | Kriegler et al. | 60/605.2 |

FOREIGN PATENT DOCUMENTS

| 747138 | 1/1944 | Germany. |
| 2103705 | 8/1971 | Germany. |
| 30742 | 5/1920 | Norway. |
| 55657 | 6/1936 | Norway. |
| 1340121 | 12/1973 | United Kingdom. |

OTHER PUBLICATIONS

Japanese Abstract No. 57-140425 dated Aug. 1983.
Russian Abstract No. 1545-000-A dated Jun. 1987.
European Search Report.

*Primary Examiner*—Forester W. Isen
*Attorney, Agent, or Firm*—Nixon & Vanderhye

[57] ABSTRACT

The control of noise emanating from engines and their exhaust systems is a difficult problem to overcome in a cost effective way. The noise may be reduced by the introduction of a fluid into the exhaust system such that the fluid is heated and expands rapidly producing sound and vibration which is in antiphase to the noise and vibration produced by the engine acting through the exhaust. There is consequent reduction in the sound and vibration produced by the system. The fluid introduced is conveniently a liquid (water) which enhances the damping effect by virtue of possessing a latent heat of vaporisation. The fluid can be added to the exhaust system by a bleed from a turbo charger or super charger or by alternate means. A primary use would be for the reduction of engine noise emanating from exhaust systems in heavy goods vehicles.

20 Claims, 2 Drawing Sheets

ACTIVE CONTROL OF NOISE

BACKGROUND OF THE INVENTION

1. Field of the Invention

The present invention relates to a method and apparatus for the active control of noise in exhaust systems.

2. Discussion of Prior Art

Conventional exhaust systems consist of a length of pipe with silencers connected to an engine. The effect is to dampen the sound and vibration produced by the exhaust gases.

As there is no perfect exhaust system there is a requirement to improve the level of sound or vibration reduction which can be achieved.

Consequently the present invention seeks to reduce the sound and vibration in an exhaust system by a method of active noise control.

SUMMARY OF THE INVENTION

Accordingly there is provided a method for reducing the noise produced by an engine's exhaust system which comprises the introduction of extra fluid to the exhaust system in addition to that produced by the exhaust output of the engine characterized in that the introduction of fluid into the system is suitably timed such that the noise source (exhaust) and noise produced by the fluid introduction are of different phase and ideally opposite.

The term exhaust system is applicable to any hot gas flow where noise is present.

It is thought that by the suitably timed addition of a fluid such as air or water into an exhaust system that the sound and vibration which this produces can be in antiphase to the originating exhaust sound and vibration. This results in a reduction or cancelling of the sound and vibration. The total noise output of the system will actually be increased if the noise produced by fluid injection is in phase with the original exhaust noise.

To produce sound an effluent gas must contract or expand to create a volume velocity, that is, there must be a net volume change. Thus volume changes in the exhaust lead to noise.

By adding a fluid to the exhaust there is an initial increase in volume which may be offset by cooling or other effects which result in an overall decrease in volume. These volume changes can oppose those occurring naturally in the exhaust. The effects of volume increase and contraction cooling can be experienced with various fluids but addition of liquid such as water has the further effect of vaporisation thus resulting in a volume increase. The latent heat of vaporisation for a liquid introduced to the exhaust has the effect of cooling the pressure peaks. Therefore if cold water is added to the hot gases of an exhaust system the effects of heat extraction and vaporisation compete. In this case the cold water and subsequent vaporisation cool the gas causing a contraction while water vapor produced by the vaporisation causes expansion.

Preferably the fluid introduction takes place in the proximity of the outlet manifold of the exhaust.

Preferably the fluid introduced is a liquid. The boiling point of any liquid introduced should be lower than the temperature of the exhaust gases to ensure vaporisation of the liquid.

Preferably the fluid introduced is water.

Whilst there are various ways of introducing the fluid it is preferably injected into the exhaust system. In the case where turbo chargers or super chargers are fitted the fluid may be pressurized into the exhaust via a bleed from the turbo charger or super charger. Alternatively, fuel injectors can be used for fluid introduction to the exhaust system.

Preferably the fluid, when a liquid is introduced into the exhaust system, is a spray.

The effective operation of the invention's active noise control depends to some extent on adopting the appropriate procedure for a particular noise source. For example where there are large source strengths it is necessary to have low exhaust temperatures together with a fine spray of liquid, preferably water, injected into the exhaust to achieve good active noise control.

Alternatively for noise sources of high bandwidth, high Mach numbers for exhaust velocity and high exhaust temperatures should be used together with a fine spray of liquid and turbulent mixing of liquid and exhaust gases.

Bandwidth of the active noise reduction system can be increased by ensuring that Forced convection occurs for the lifetime of the spray droplets. This may be achieved by disturbing the Flow up and downstream of the injector or other entry system to the exhaust.

Furthermore sound level and hence active noise control may be increased by ensuring that the Final temperature is less than 100° C. It is believed that this is because the latent heat has been partly extracted without vaporisation. Final temperature as used herein refers to that temperature at which there is no net change in injected fluid volume within the exhaust which yields noise.

The invention is considered to have particular utility in reducing the noise levels in exhaust systems of heavy goods vehicles.

BRIEF DESCRIPTION OF THE DRAWINGS

The invention will now be described by way of example only and with reference to the accompanying Drawings in which.

DETAILED DISCUSSION OF PREFERRED EMBODIMENTS

For sound production it is necessary to have a volume change in a gas. Exhaust gases from an engine expand as they move from a high pressure area to a low pressure area. A sound absorbing system should thus be effective to produce volume contraction in the exhaust gas flow. When water is injected into a hot exhaust system there are four states of the isobaric process to consider. These are the initial state upon injection; the mixing, heat exchange and expansion; vaporisation; and equilibrium where the final temperature is greater than 100° C.

| State | | |
|---|---|---|
| 1. $n_a$ moles of hot gas, volume $V_{a1}$, Temperature $T_{a1}$, and $n_L$ moles of water at $T_{L1}$ | Gas $V_{a1}$ $T_{a1}$, $n_a$ | $H_2O$ liquid $n_L$, $T_{L1}$ |
| 2. Allow mixing, heat exchange and expansion | Gas: $V_{a2}$, $T_{a2}$ $H_2O$: $T_{L2} = 100°$ C. | |
| 3. Vaporisation | Gas: $V_{a3}$, $T_{a3}$ $H_2O$ vapour: $T_{v2} = 100°$ C., $n_v = n_L$ | |

-continued

| State | |
|---|---|
| 4. Equilibrium at $T_f > 100°$ C. | Gas + $H_2O$: $V_f$, $T_F$, $n = n_a + n_L$ |

The heat required to vaporize $n_1$ moles of water under constant pressure equals the enthalpy extracted from the exhaust gas (states 1 and 3):

$$H_v = n_L(c_L c_{pL}(T_{L2} - T_{L1})) = -c_{pa} n_a(T_{a3} - T_{a1})$$

where
$c_L$ = the latent heat of vaporisation of water
$c_{pL}$ = specific heat capacity of water at constant pressure
$c_{pa}$ = specific heat capacity of gas at constant pressure Rearrangement gives $$T_{a3} = T_{a1} - X(c_L + c_{pL}(T_{L2} - T_{L1}))/c_{pa} = T_{a1} - BX$$

where $X = n_L/n_a$ is the ratio of water to gas in the mix.

For the change from vaporisation to equilibrium. (state 3 to state 4) assuming perfect gas behavior (valid for small X) then if there is no heat exchange with the outside environment $dH = 0$ and $H_3 = H_f$, that is:

$$c_{pa} n_a(T_{a3} - T_0) + c_{pv} n_v(T_{v3} - T_0) = c_p n(T_f - T_0)$$

where $T_o$ = a reference temperature

For mixtures of perfect gases some thermodynamic properties of the mixture are just the weighted sum of the corresponding properties of the constituents (Gibbs-Dalton Law). This is applied here:

$$c_p n = \sum_i c_{pi} n_i$$

Applied above and rearranged gives:

$$T_f = RT_{a3} + T_{v3}/1 + R$$

where $R = (1/X)(c_{pa}/c_{pv})$

Finally, for a perfect gas the fractional volume change from the temperature change is:

$$\Delta = V_f/V_{a1} = (1+X)T_f/T_{a1}$$

Figure 1:
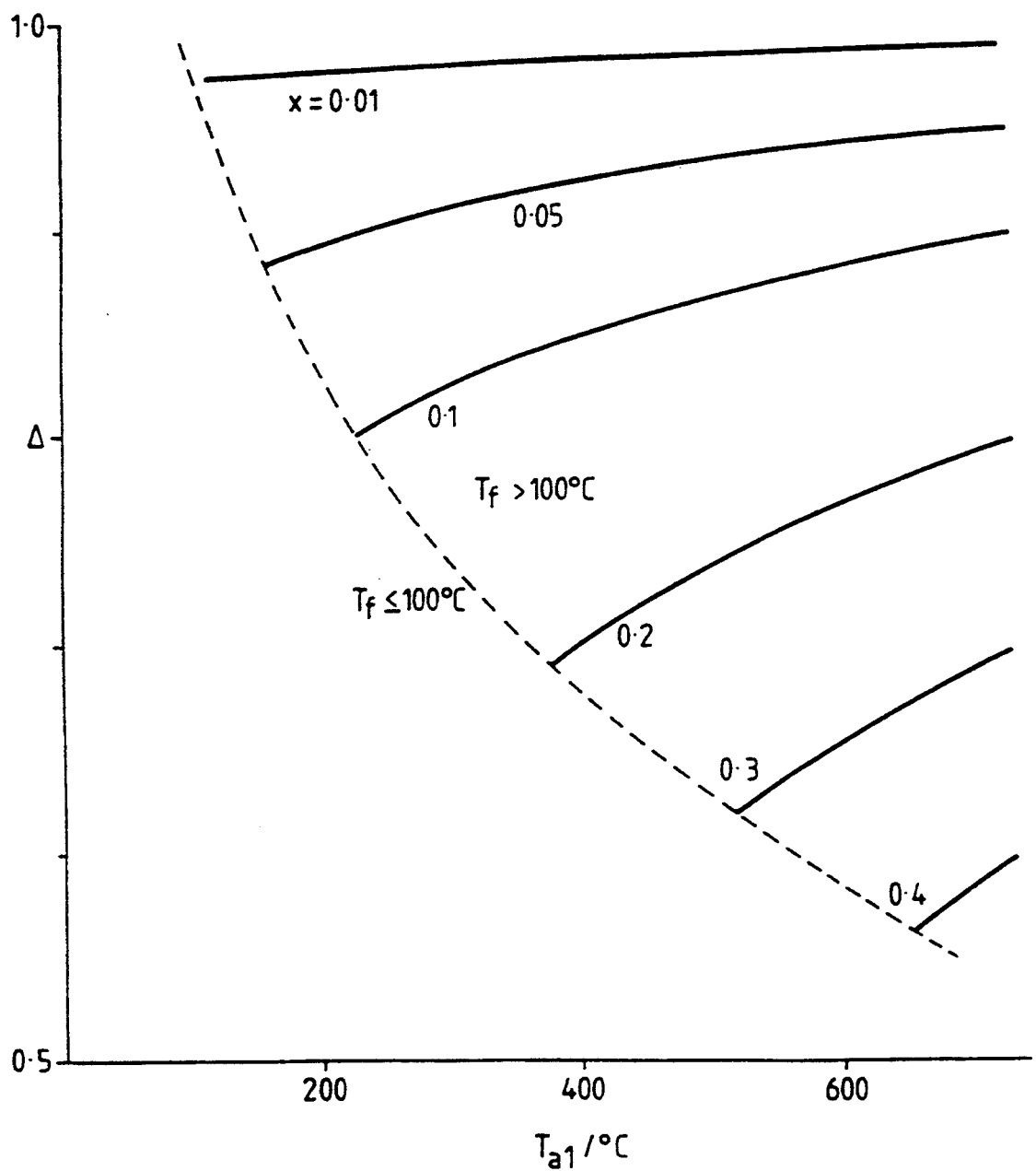
FIG. 1 shows a graph of volume change For water against initial temperature and where $\Delta$ is the volume change factor produced by injection of X moles of water (at 15° C.) per mole or exhaust gas at temperature $T_{a1}$.
Figure 2:
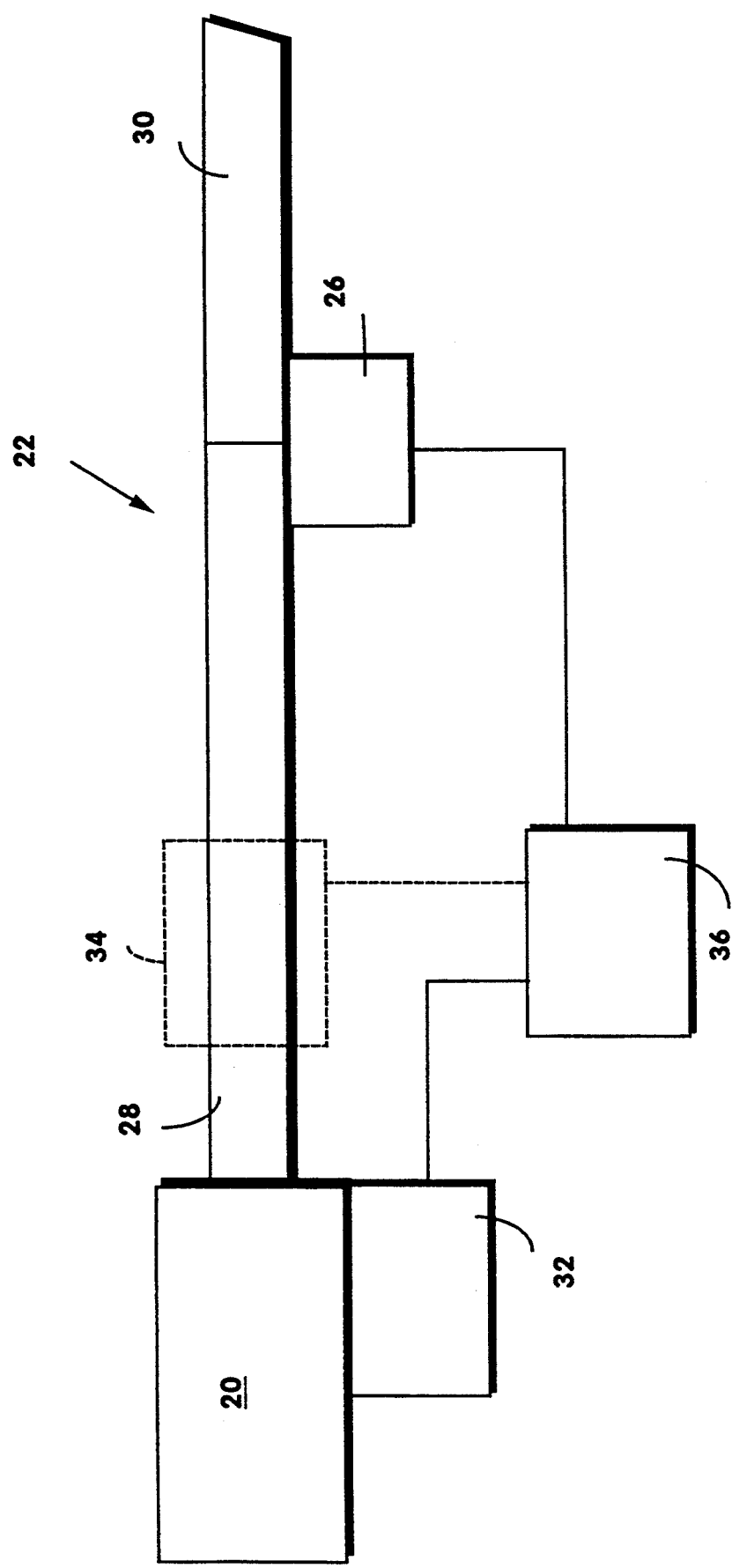
FIG. 2 is a block diagram of the present invention.

The water must remain as vapor in the final state for this expression to be valid. A petrol engine exhaust contains typically 75% $N_2$, 10% $CO_2$ and 15% $H_2O$ assuming stoichometric combustion. The specific heat capacity of the exhaust gas will be dominated by that of Nitrogen. By taking the initial water as $T_{L1} = 15°$ C. and molar heat capacities $c_{pa} = 34$ Jmol$^{-1}$K$^{-1}$, $c_{pv} = 36$ Jmol$^{-1}$K$^{-1}$, $c_{pL} = 75.4$ Jmol$^{-1}$K$^{-1}$, $c_L = 40600$ Jmol$^{-1}$ (these values applying at atmospheric pressure and at the relevant temperatures), gives a set of curves of as a function of X and initial exhaust temperature $T_{a1}$, as shown in FIG. 1. The figure shows that, for water at least, there is always a net contraction in volume.

Where the invention has been applied to a 60 kw diesel generator by the injection of water into the exhaust system using a relatively simple arrangement an acoustic source was produced of comparable strength to the engine at frequencies below 25 Hz. Such a system is illustrated in FIG. 2 where the engine 20 includes an exhaust system 22. Spray liquid injector 26, responsive to the phase of the exhaust sound injects liquid into said exhaust out of phase or antiphase to the originating exhaust sound. In a preferred embodiment, the exhaust system 22 includes an exhaust manifold 28 which joins an exhaust pipe 30. The fluid injector 26 injects a water spray near the outlet of the exhaust manifold 28. A preferred embodiment uses the bleed from a super charger 32 (alternatively a turbo charger 34) to pressurize a liquid supply 36 which provides liquid to liquid injector 26.

We claim:

1. A method for reducing the noise produced by an engine's exhaust system which comprises the introduction of a liquid to the exhaust system in addition to that produced by the exhaust output of the engine; wherein the introduction of liquid into the system is suitably timed such that said noise produced by an engine's exhaust system and noise produced by the liquid introduction are of different phase.

2. A method of noise reduction as claimed in claim 1 wherein the liquid introduction takes place in the proximity of the outlet manifold of the exhaust.

3. A method of noise reduction as claimed in claim 1 wherein the liquid is water and a final temperature is less than 100° C. where said final temperature is that temperature at which there is no net change in injected fluid volume within the exhaust which yields noise.

4. A method of noise reduction as claimed in claim 1 wherein the fluid introduced is water.

5. A method of noise reduction as claimed in claim 1 wherein the liquid is injected into the exhaust system.

6. A method of noise reduction as claimed in claim 1 wherein turbo chargers or super chargers are fitted to pressurize liquid into the exhaust via a bleed from the turbo charger or super charger.

7. A method of noise reduction as claimed in claim 1 wherein the liquid is introduced into the exhaust system as a spray.

8. A method of noise reduction as claimed in claim 1 wherein a fine spray of liquid is injected into the exhaust.

9. A method of noise reduction as claimed in claim 1 wherein, for noise sources of high bandwidth, high Mach number exhaust velocities and high exhaust temperatures are used in combination with a fine spray of liquid and turbulent mixing of liquid and exhaust gases.

10. A method of noise reduction as claimed in claim 8 wherein the bandwidth of the active noise reduction system is increased by ensuring that forced convection occurs for the lifetime of the spray droplets.

11. A method of noise reduction as claimed in claim 10 wherein forced convection is achieved by disturbing the flow up and downstream of the injector or other entry system to the exhaust.

12. An active noise reduction system for reducing periodic exhaust noise in an engine having an exhaust system, said noise reduction system comprising:
    phase measuring means for measuring the phase of said periodic exhaust noise; and
    liquid injector means, responsive to said phase measuring means, for injecting liquid into said exhaust system antiphase with respect to said periodic exhaust noise.

13. The apparatus of claim 12, wherein said liquid injector means is a spray liquid injector.

14. The apparatus according to claim 13, wherein said liquid is water.

15. The apparatus according to claim 12, wherein said liquid is water.

16. The apparatus according to claim 12, wherein said exhaust system includes an exhaust manifold with an outlet and said liquid injector means includes means for injecting liquid near said outlet.

17. The apparatus according to claim 16, wherein said liquid is water.

18. The apparatus according to claim 17, wherein said injected water is in the form of an injected water spray.

19. The apparatus of claim 12, wherein said engine includes a super charger, and said liquid injector means includes a liquid supply, said super charger comprising a means for pressurizing said liquid supply.

20. The apparatus of claim 12, wherein said engine includes a turbo charger, and said liquid injector means includes a liquid supply, said turbo charger comprising a means for pressurizing said liquid supply.

* * * * *